(12) United States Patent  
Sogawa

(10) Patent No.: US 6,764,188 B2  
(45) Date of Patent: Jul. 20, 2004

(54) LIGHT SCANNER

(75) Inventor: Teruaki Sogawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 2 days.

(21) Appl. No.: 10/262,886

(22) Filed: Oct. 3, 2002

(65) Prior Publication Data

US 2003/0067694 A1 Apr. 10, 2003

(30) Foreign Application Priority Data

Oct. 5, 2001 (JP) .................................... P2001-310754

(51) Int. Cl.[7] ............................................. G02B 7/182
(52) U.S. Cl. ..................................... 359/871; 248/475.1
(58) Field of Search .............................. 359/871, 208, 359/205, 838; 248/549, 560, 466, 475.1, 476, 477, 488; 369/112.01, 112.29

(56) References Cited

U.S. PATENT DOCUMENTS 5,194,994 A * 3/1993 Takizawa et al. ........... 359/871

FOREIGN PATENT DOCUMENTS

| JP | 2-135922 U | 11/1990 |
|----|------------|---------|
| JP | 3-174108 | 7/1991 |
| JP | 2000-235158 | 8/2000 |

* cited by examiner

*Primary Examiner*—Euncha P. Cherry  
(74) *Attorney, Agent, or Firm*—Morgan, Lewis & Bockius LLP

(57) ABSTRACT

An attachment part of a mirror fixture is housed in a recess part of an optical system unit and edge-like end margins of a pair of opposed engagement piece parts of the attachment part are retained on a pair of opposed walls and of the recess part in a press state. An operational piece part is extended backward from each of the engagement piece parts and housed in an operational jib insertion recess-in part 10 of the optical system unit. If the tip of an operational jig such as tweezers is inserted into the recess-in part and the operational piece parts are deformed inward, the engagement pieces parts also become deformed inward and the retention state with the walls is released.

7 Claims, 7 Drawing Sheets

LIGHT SCANNER

CROSS REFERENCE OF RELATED APPLICATION

This application is based on and claims priority under 35 U.S.C. §119 with respect to Japanese Patent Application No. 2001-310754 filed on Oct. 5, 2001, the entire content of which is incorporated herein by reference.

BACKGROUND OF THE INVENTION

1. Field of the Invention

This invention relates to a light scanner used to write information onto a disk and read information on a disk using a light beam and in particular to a light scanner having an optical system unit including a half mirror.

2. Description of the Related Art

This kind of light scanner applies a light beam to a rotating disk, thereby reading or writing information from or onto the disk, wherein an optical system unit for applying a light beam can be moved in a direction along the radius direction of the disk and optical parts such as a half mirror are built in the optical system unit.

FIG. 5 is a partial plan view of an optical system unit adopted for a light scanner in a related art, FIG. 6 is a sectional view taken on line VI—VI of FIG. 5, and FIG. 7 is a perspective view of a mirror fixture. A light scanner in a related art will be discussed with reference to FIGS. 5 to 7.

In the light scanner, an optical system unit 1 made of a synthetic resin molded substance is formed with through holes 2 and 3 for forming an optical path, and a half mirror 4 facing the through holes 2 and 3 is attached to the optical system unit 1. Specifically, the optical system unit 1 is formed with a recess space 5, the left and right end parts of the rectangular half mirror 4 are placed on an inclined mirror attachment reference face 6 formed stepwise in the inside of the recess space 5, and the half mirror 4 is pressed against and fixed to the mirror attachment reference face 6 by the action of a mirror fixture 7.

As shown in FIG. 7, the mirror fixture 7 is made of a metal steel and has a pair of left and right arm-like press parts 71 and 71 and an attachment part 72 and the attachment part 72 comprises a pair of left and right protrusion piece parts 73 and 73 and retention claws 74 and 74 cut and raised. The attachment part 72 is inserted into a groove-shaped recess part 8 formed on the rear of the recess space 5 of the optical system unit 1, the front end margins of the left and right protrusion piece parts 73 and 73 of the attachment part 72 are abutted against a front wall 81 of the groove-shaped recess part 8, edge-like end margins 74a and 74a of the retention claws 74 and 74 are retained on a rear wall 82 of the groove-shaped recess part 8 in a press state, and the left and right press parts 71 and 71 overlap the left and right end parts of the half mirror 4 for pressing and fixing the half mirror 4 against and to the mirror attachment reference face 6.

On the other hand, JP-A-3-174108 describes use of a plate spring and an adhesive to fix a half mirror to an optical system main body (corresponding to the above-described optical system unit) in an optical information record and playback apparatus, fitting a positioning hole of the plate spring into a resin boss part placed in the optical system main body to fix the plate spring to the optical system main body, etc.

JP-A-2000-235158 describes a configuration for attaching a plate spring to a mirror holder screwed into an optical box of a light scanner and holding a half mirror on the mirror holder by the plate spring.

Further, JP-A-2-135922U describes a configuration for using a plate spring to position a half mirror placed in an optical parts holder of an optical pickup.

In the light scanner in the related art described with reference to FIGS. 5 to 7, the attachment part 72 of the mirror fixture 7 is inserted into the narrow groove-shaped recess part 8 and the end margins 74a of the retention claws 74 cut and raised in the attachment part 72 are retained on the rear wall 82 of the groove-shaped recess part 8 in a press state. Thus, the retention claws 74 are retained on the rear wall 82 of the groove-shaped recess part 8, whereby the removal prevention effect of the mirror fixture 7 is exerted. However, after the mirror fixture 7 is once attached to the optical system unit 1, it is difficult to remove the mirror fixture 7 and if the mirror fixture 7 is forcibly pulled out for removal, the end margins 74a of the retention claws 74 scratch or cut away the rear wall 82 of the groove-shaped recess part 8. Therefore, even if the attachment state becomes defective in the attachment process of the mirror fixture 7 to the optical system unit 1, it is difficult to remove the mirror fixture 7 from the optical system unit 1 and again attach the mirror fixture 7 thereto, and it is made impossible to again use the optical system unit 1 from which the mirror fixture 7 is removed because the optical system unit 1 is scratched, etc.; this is a problem.

The arts described above in JP-A-3-174108, JP-A-2000-235158, JP-A-2-135922U, etc., do not fix the mirror fixture to the optical system unit by retaining the edge-like end margins of the retention claws on the wall of the optical system unit.

SUMMARY OF THE INVENTION

It is therefore an object of the invention to provide a light scanner wherein although a mirror fixture can be attached to an optical system unit by simple operation similar to that in the related art described with reference to FIGS. 5 to 7, the once attached mirror fixture can be easily removed from the optical system unit and moreover it is made possible to reuse the removed mirror fixture and reuse the optical system unit from which the mirror fixture is removed.

In a light scanner according to the invention, an attachment part of a mirror fixture comprising press parts to press and fix a half mirror against and to a mirror attachment reference face of an optical system unit is fixed to the optical system unit.

The attachment part of the mirror fixture is housed in a recess part of the optical system unit, edge-like end margins of a pair of opposed engagement piece parts of the attachment part are retained on a pair of opposed walls in the recess part in a press state, and the engagement piece parts comprise operational piece parts for elastically deforming the engagement pieces parts inward for releasing the retention state of the end margins and the walls of the recess part.

In the configuration, simply by inserting the attachment part of the mirror fixture into the recess part of the optical system unit, the edge-like end margins of the engagement piece part pair of the attachment part can be retained on the pair of opposed walls in the recess part in a press state, so that the attachment workability of the mirror fixture to the optical system unit becomes equal to that in the related art described with reference to FIGS. 5 to 7. To remove the mirror fixture from the optical system unit, the operational piece parts can be operated for inward elastically deforming the engagement piece parts engaging the walls of the recess part in a press state for releasing the retention state of the end margins of the engagement piece parts and the walls of the recess part. Thus, it is possible to take out the attachment part from the recess part and remove the mirror fixture from the optical system unit without scratching or cutting away the wall of the recess part. Thus, it is possible to reuse the removed mirror fixture and reuse the optical system unit from which the mirror fixture is removed.

In the invention, preferably the operational piece parts are projected backward from the engagement piece parts and the optical system unit is provided with an operational jig insertion recess-in part for housing the operational piece parts and being wider than the recess part. Accordingly, the operational piece parts can be operated in a state in which the tip of the operational jig such as tweezers is inserted into the recess-in part and as the operational piece parts are operated, the retention state of the end margins of the engagement piece parts and the walls of the recess part can be released. The engagement piece parts are housed in the recess part and the operational piece parts projected backward from the engagement piece parts are housed in the recess-in part, so that the engagement piece parts and the operational piece parts do not project from the optical system unit. Thus, a situation in which the operational piece part is operated by accidental operation of mischief, etc., is prevented.

In the invention, preferably the operational piece part has a plate piece part provided in one piece extending between lower end margins of the engagement piece parts and the plate piece part is formed with a split groove extending forward from the rear end of the plate piece part. Accordingly, the plate piece part is formed with the split groove, so that the elastic force of the engagement piece part is exerted not only by the elastic action of the engagement piece part itself, but also by the elastic action of the plate piece part. Thus, it becomes easy to adjust the magnitude of the elastic force when the engagement piece part is retained on the wall of the recess 9.

In the invention, preferably the plate piece part is put on a bottom wall of the recess part and is formed with an insertion hole of a mounting screw screwed into the optical system unit. Accordingly, it is made possible to attach the mirror fixture to the optical system unit more reliably with the mounting screw.

The light scanner according to the invention can be configured more specifically as follows: A light scanner wherein an attachment part of a mirror fixture comprising arm-like press parts to press and fix a half mirror against and to a mirror attachment reference face of an optical system unit is fixed to the optical system unit, wherein the attachment part of the mirror fixture is housed in a recess part of the optical system unit, wherein edge-like end margins of a pair of opposed engagement piece parts of the attachment part are retained on a pair of opposed walls in the recess part in a press state, wherein operational piece parts for elastically deforming the engagement pieces parts inward for releasing the retention state of the end margins and the walls of the recess part are extended backward from the engagement piece parts, wherein the optical system unit is provided with an operational jig insertion recess-in part for housing the operational piece parts and being wider than the recess part, wherein a plate piece part of the attachment part extending between lower end margins of the engagement piece parts is put on a bottom wall of the recess part, and wherein the plate piece part is formed with an insertion hole of a mounting screw screwed into the optical system unit and a split groove crossing the plate piece part in a back and forth direction in a rear part of the insertion hole.

The advantages of the invention will be discussed in detail in the following embodiment:

DETAILED DESCRIPTION OF THE PREFERRED EMBODIMENTS

Now, a description will be given in more detail of preferred embodiments of the invention with reference to the accompanying drawings.

Figure 1:
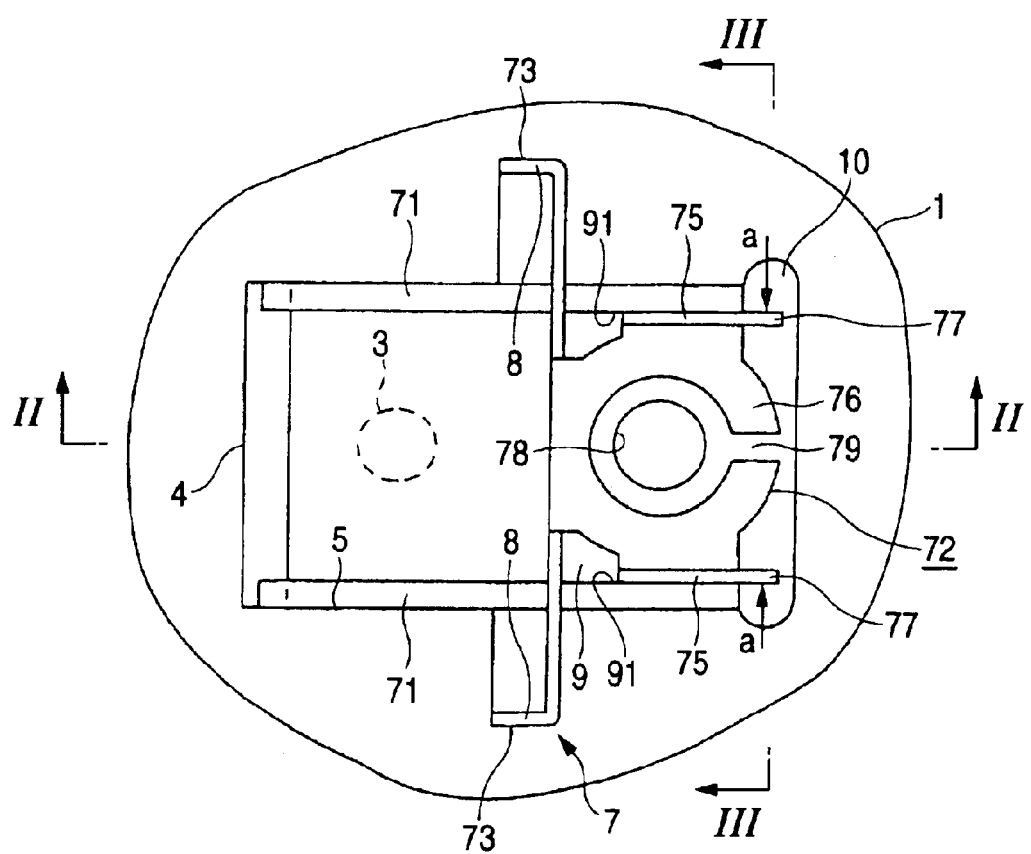
FIG. 1 is a partial plan view of an optical system unit adopted for a light scanner of the invention.
Figure 2:
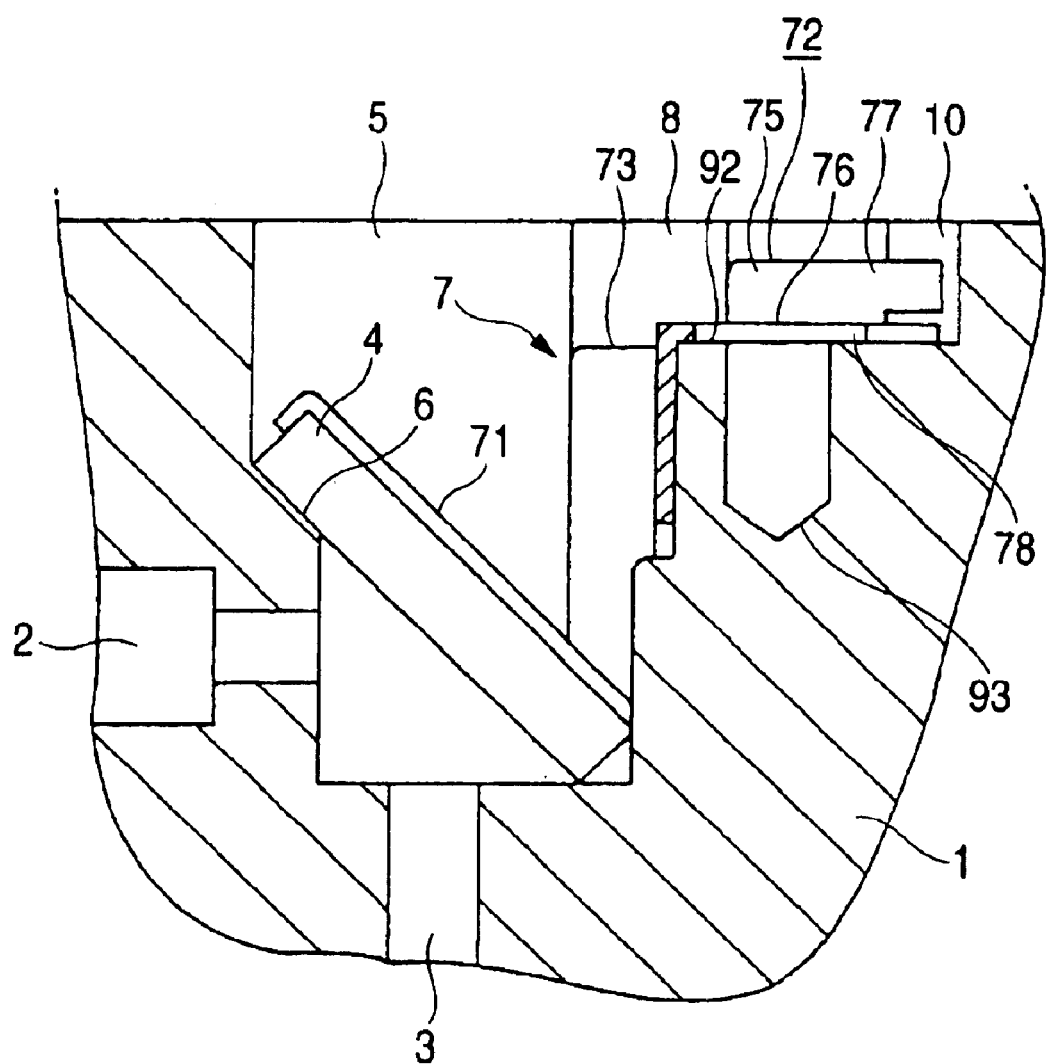
FIG. 2 is a sectional view taken on line II—II of FIG. 1.
Figure 3:
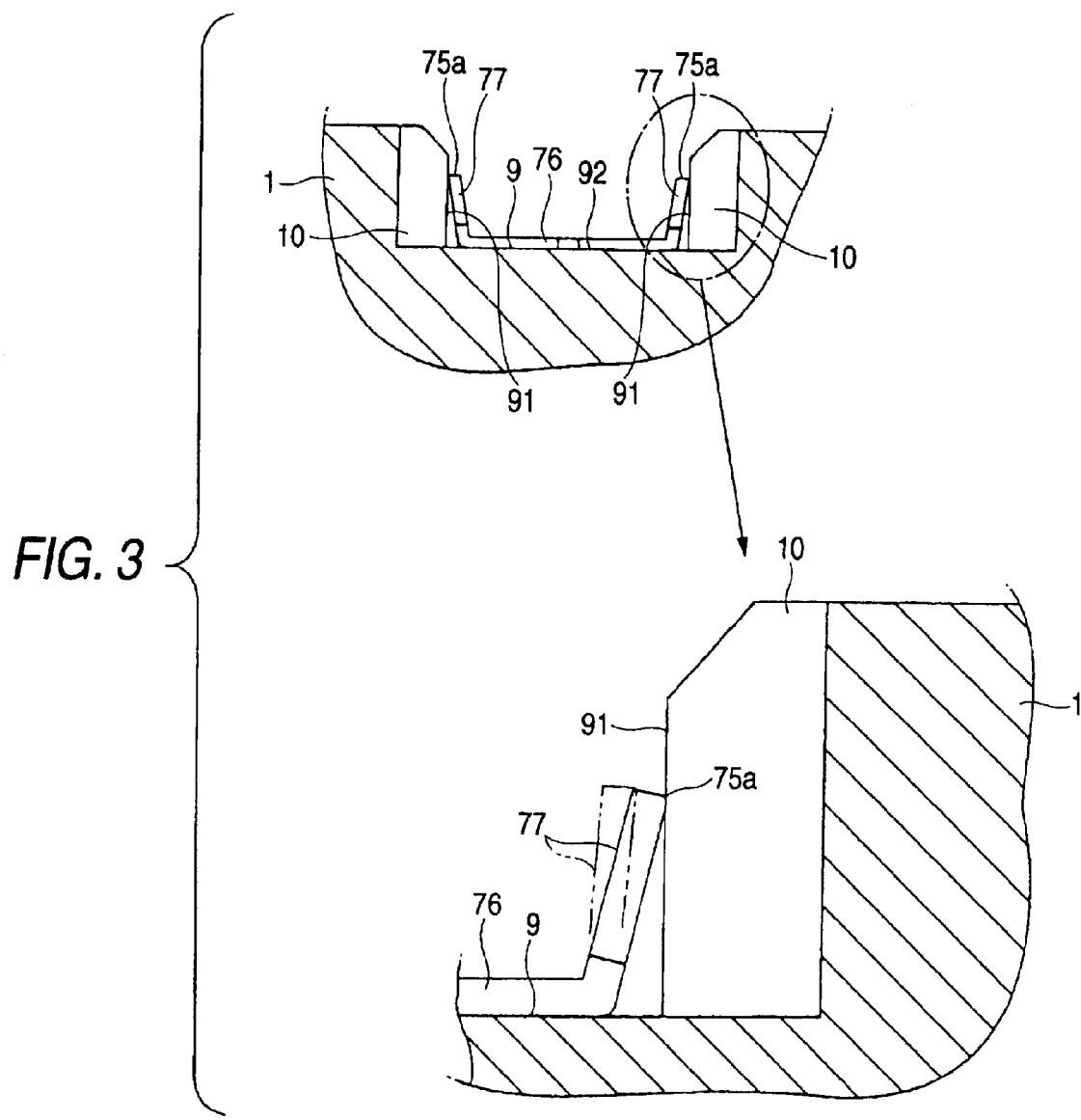
FIG. 3 is a sectional view taken on line III—III of FIG. 1.
Figure 4:
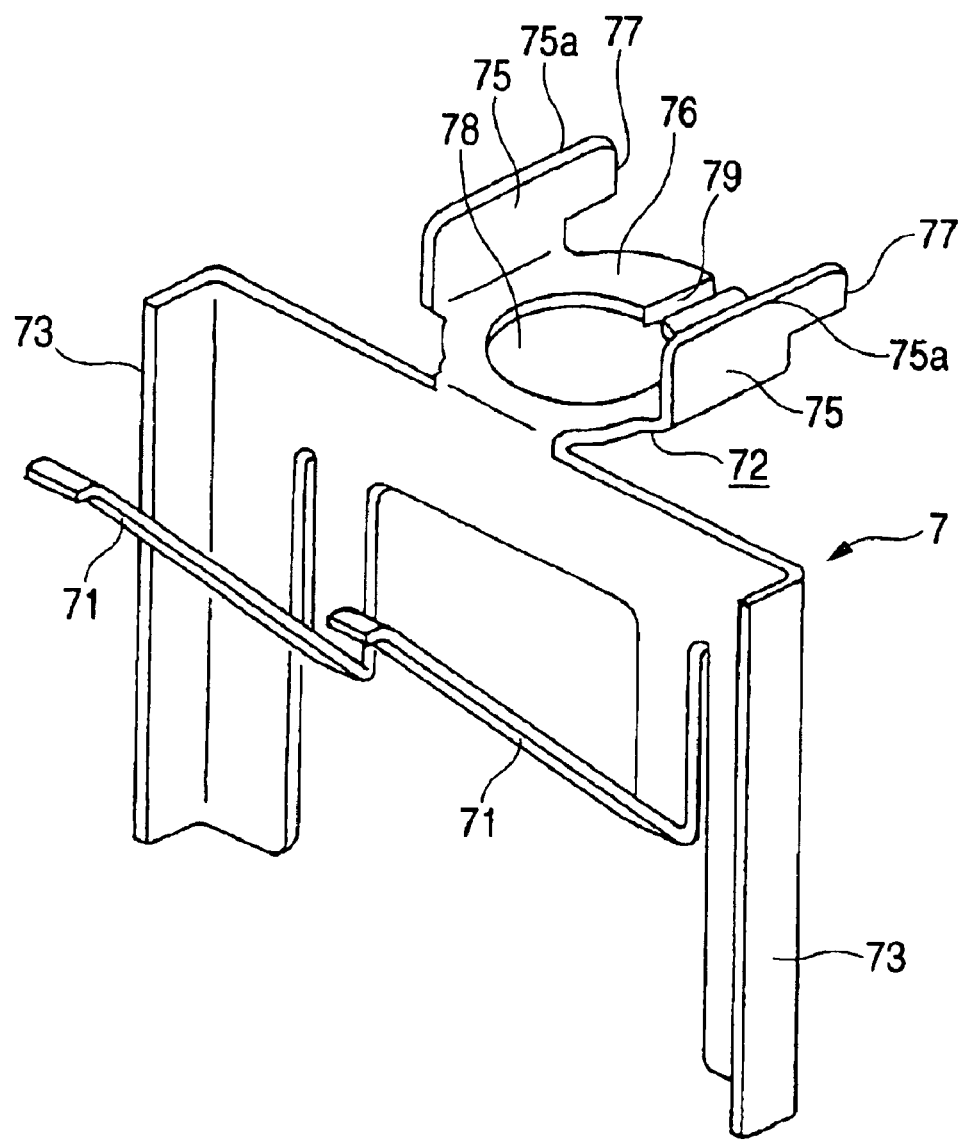
FIG. 4 is a perspective view of a mirror fixture.

FIG. 1 is a partial plan view of an optical system unit adopted for a light scanner of the invention, FIG. 2 is a sectional view taken on line II—II of FIG. 1, FIG. 3 is a sectional view taken on line III—III of FIG. 1, and FIG. 4 is a perspective view of a mirror fixture.

A light scanner of the invention is similar to the light scanner in the related art previously described with reference to FIG. 5 or 6 in that an optical system unit 1 is formed with through holes 2 and 3 for forming an optical path and a half mirror 4 facing the through holes 2 and 3 is attached to the optical system unit 1 and that the optical system unit 1 is formed with a recess space 5, the left and right end parts of the rectangular half mirror 4 are placed on an inclined mirror attachment reference face 6 formed stepwise in the inside of the recess space 5, and the half mirror 4 is pressed against and fixed to the mirror attachment reference face 6 by the action of a mirror fixture 7.

As shown in FIG. 4, the mirror fixture 7 is made of a metal steel and comprises a pair of left and right arm-like press parts 71 and 71, a pair of left and right protrusion piece parts 73 and 73, and an attachment part 72 in a horizontal attitude. The attachment part 72 comprises a pair of engagement piece parts 75 and 75 opposed to each other in a standing-up attitude and a plate piece part 76 extending between the lower end margins of the engagement piece parts 75 and 75. An operational piece part 77 is extended backward from each of the engagement piece parts 75 and 75 and a circular mounting screw insertion hole 78 is made in the plate piece part 76. Further, the plate piece part 76 is divided left and right by a split groove 79 crossing the plate piece part 76 in a back and forth direction in a rear part of the mounting screw insertion hole 78. The engagement piece part 75 is formed like a rectangle horizontally oriented on a side view and comprises an edge-like end margin 75a.

In contrast, the optical system unit 1 is formed with the above-mentioned recess space 5, a groove-shaped recess part 8 positioned at the rear part of the recess space 5 and extending to both left and right sides of the recess space 5, a recess part 9 rectangular on a plan view, positioned on the rear of the recess space 5, and a recess-in part 10 positioned on the rear of the recess part 9 and wider than the recess part 9.

Here, the left and right engagement piece parts 75 and 75 of the attachment part 72 of the mirror fixture 7 are in an upward open attitude and the mutual spacing between the edge-like end margins 75a and 75a is a little wider than the mutual spacing between left and right walls 91 and 91 of the recess part 9.

To attach the mirror fixture 7 to the optical system unit 1, the half mirror 4 is placed on the mirror attachment reference face 6 of the optical system unit 1 and then the left and right protrusion piece parts 73 and 73 are inserted into the groove-shaped recess part 8, whereby the halt mirror 4 is pressed against the mirror attachment reference face 6 in a press state by a pair of left and right arm-like press parts 71 and 71 and while the end margins 75a and 75a of the left and right engagement piece parts 75 and 75 of the attachment part 72 are slid on the left and right walls 91 and 91 of the recess part 9, the attachment part 72 is inserted into the recess part 9. In doing so, as shown in FIG. 3, the edge-like end margins 75a and 75a of the left and right engagement piece parts 75 and 75 are retained on the left and right walls 91 and 91 of the recess part 9 in a press state and the plate piece part 76 overlaps a bottom wall 92 of the recess part 9. As shown in FIGS. 1 and 2, the half mirror 4 is pressed against and fixed to the mirror attachment reference face 6 of the optical system unit 1 by the left and right press parts 71 and 71, and the operational piece parts 77 and 77 are housed in the recess-in part 10.

Accordingly, the attachment part 72 of the mirror fixture 7 is positioned in the recess part 9 as the edge-like end margins 75a and 75a of the left and right engagement piece parts 75 and 75 are retained on the left and right walls 91 and 91 of the recess part 9, so that the mirror fixture 7 is attached to the optical system unit 1 so as not to move. Moreover, the half mirror 4 is pressed and clamped by the mirror attachment reference face 6 and the left and right press parts 71 and 71 and is positioned at a constant position.

Fixing the mirror fixture 7 to the optical system unit 1 is sufficiently possible simply by retaining the edge-like end margins 75a and 75a of the left and right engagement piece parts 75 and 75 on the left and right walls 91 and 91 of the recess part 9, as described above. However, to further enhance the fixing reliability, as shown in FIG. 1 or 2, a rough hole 93 to screw a mounting screw (not shown) may be made in the bottom wall of the recess part 9 and the mounting screw may be screwed into the rough hole 93 through the mounting screw insertion hole 78 of the attachment part 72 and may be fastened.

In the attachment state, the whole of the attachment part 72 is housed in the recess part 9 and the operational piece part 77 is housed in the recess-in part 10, so that the engagement piece part 75 and the operational piece part 77 do not project from the optical system unit 1. Thus, it is not feared that the operational piece part 77 may be operated by mischief, thereby accidentally removing the mirror fixture 7 or the half mirror 4 from the optical system unit 1.

In the embodiment, if a situation occurs in which the attachment state of the half mirror 4 is defective for some reason as the attachment work as described above is performed, the mirror fixture 7 once attached to the optical system unit 1 can be removed and again be attached, as described below:

To remove the mirror fixture 7 from the optical system unit 1, the tip of an operational jig such as tweezers (not shown) is inserted into both end parts of the recess-in part 10 shown in FIG. 1 and is positioned outside the operational piece parts 77 and 77 and from this state, the operational piece parts 77 and 77 are deformed inward as indicated by arrows a and a by the tip of the operational jig. The enlarged view of FIG. 3 shows the inward deformed operational piece part 77 by a phantom line. In doing so, the engagement piece parts 75 and 75 engaging the walls 91 and 91 of the recess part 9 in a press state become elastically deformed together with the operational piece parts 77 and 77, so that the retention state of the end margins 75a and 75a (see FIG. 3) of the engagement piece parts 75 and 75 and the walls 91 and 91 of the recess part 9 is released. The attachment part 72 is pulled up from the recess part 9 in the retention state release state, whereby the mirror fixture 7 is removed from the optical system unit 1. In doing so, the mirror fixture 7 can be removed without scratching the wall 91, 91 of the recess part 9, so that it is possible to reuse the mirror fixture 7 and the optical system unit 1.

In the embodiment, the plate piece part 76 is formed with the split groove 79, so that the elastic force of the engagement piece part 75 is exerted not only by the elastic action of the engagement piece part 75 itself, but also by the elastic action of the plate piece part 76. Thus, it becomes easy to adjust the magnitude of the elastic force when the engagement piece part 75 is retained on the wall 91 of the recess 9, leading to usefulness for enhancing the attachment safety of the half mirror 4 by the mirror fixture 7 and enhancing the attachment workability when the mirror fixture 7 is attached to the optical system unit 1.

Figure 5:
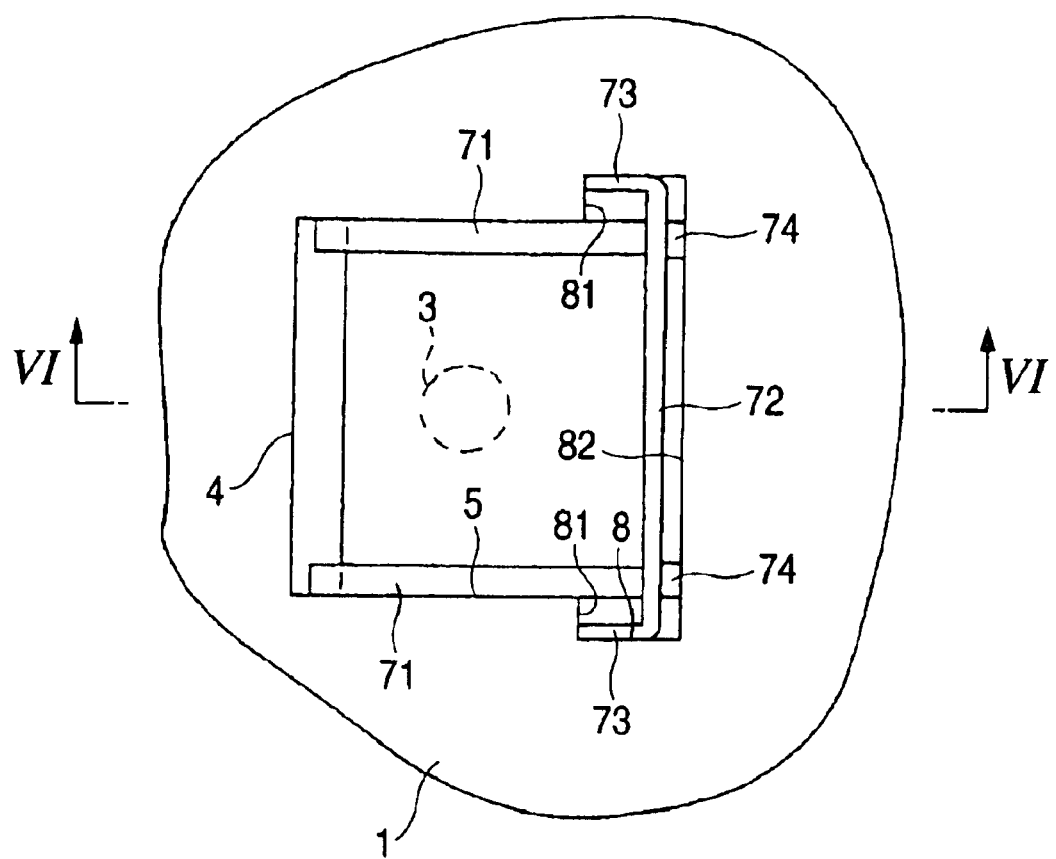
FIG. 5 is a partial plan view of an optical system unit adopted for a light scanner in a related art.
Figure 6:
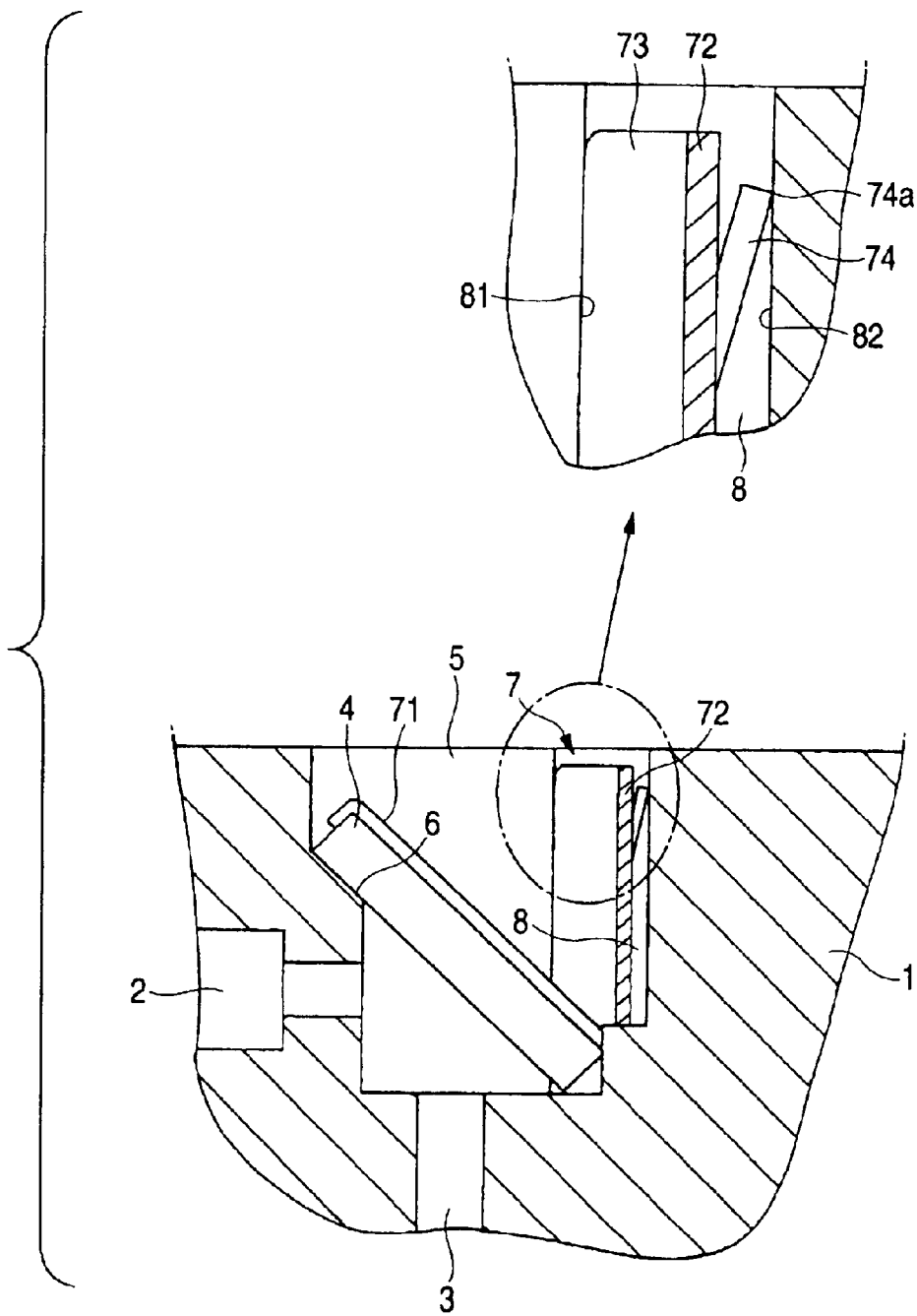
FIG. 6 is a sectional view taken on line VI—VI of FIG. 5.
Figure 7:
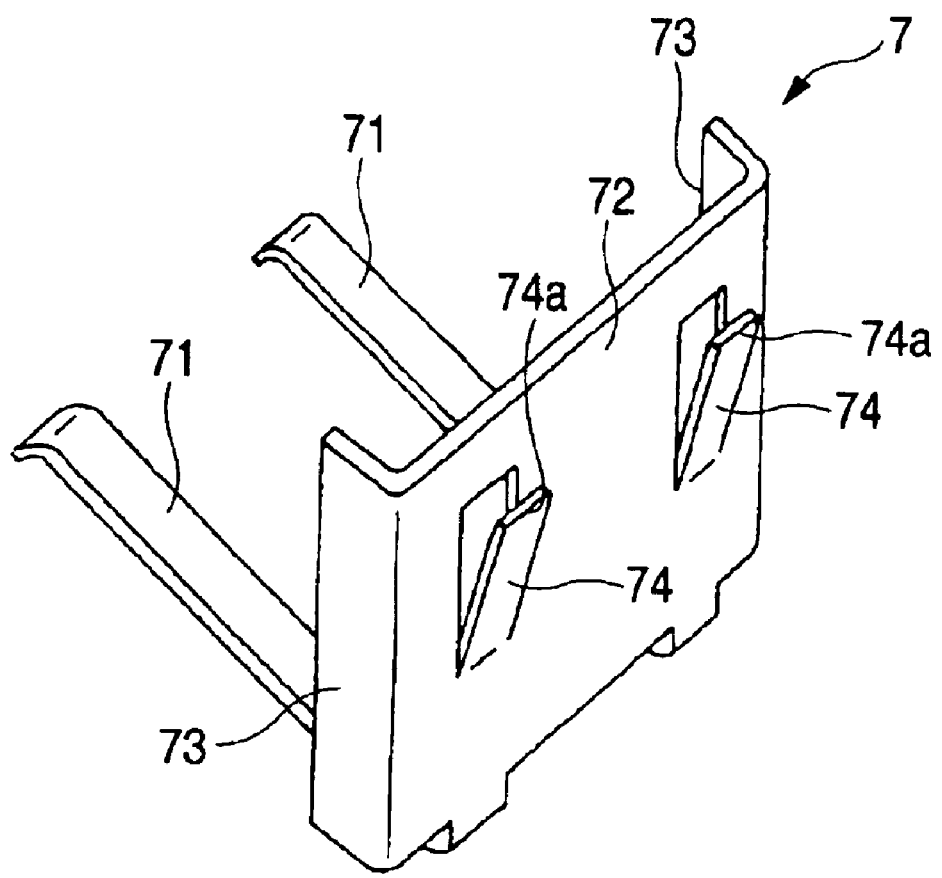
FIG. 7 is a perspective view of a mirror fixture shown in FIG. 5.

Parts identical with or similar to those previously described with reference to FIGS. 5 to 7 are denoted by the same reference numerals in FIGS. 1 to 4.

As described above, according to the invention, there is provided the advantage that although a mirror fixture can be attached to an optical system unit by simple operation similar to that in the related art previously described with reference to FIGS. 5 to 7, it is made possible to easily remove the once attached mirror fixture from the optical system unit and moreover it is made possible to reuse the removed mirror fixture and reuse the optical system unit from which the mirror fixture is removed. Particularly, in the light scanner wherein the operational piece parts are housed in the recess-in part of the optical system unit, there is no fear of occurrence of a situation in which the operational piece parts are operated accidentally and the attachment state of the mirror fixture and the half mirror becomes unstable. Thus, the stability of reading and writing information from and onto a disk can be improved.

What is claimed is:

1. A light scanner, comprising:

a half mirror;

an optical system unit having a mirror attachment reference face; and a mirror fixture attachment part including arm-like press parts for pressing and fixing the half mirror against and to the mirror attachment reference face of the optical system unit is fixed to the optical system unit, wherein the attachment part of the mirror fixture is housed in a recess part of the optical system unit, that edge-like end margins of a pair of opposed engagement piece parts of the attachment part are retained on a pair of opposed walls in the recess part in a press state, that operational piece parts for elastically deforming the engagement pieces parts inward for releasing a retention state of the end margins and the walls of the recess part are extended backward from the engagement piece parts, that the optical system unit is provided with an operational jig insertion recess-in part for housing the operational piece parts and being wider than the recess part, that a plate piece part of the attachment part extending between lower end margins of the engagement piece parts is put on a bottom wall of the recess part, and that the plate piece part is formed with an insertion hole of a mounting screw screwed into the optical system unit and a split groove crossing the plate piece part in a back and forth direction in a rear part of the insertion hole.

2. A light scanner, comprising:

a half mirror;

an optical system unit having a mirror attachment reference face; and a mirror fixture including arm-like press parts for pressing and fixing the half mirror against and to the mirror attachment reference face of the optical system unit, and an attachment part fixed to the optical system unit and having a pair of opposed engagement piece parts, wherein the attachment part of the mirror fixture is housed in a recess part of the optical system unit, the pair of opposed engagement piece parts of the attachment part are retained on a pair of opposed walls in the recess part in a press state, the engagement piece parts comprise operational piece parts for elastically deforming the engagement pieces parts inward for releasing a retention state of the engagement piece parts from the walls of the recess part, and each of the press parts is in contact with the half mirror.

3. A light scanner comprising:

a half mirror;

an optical system unit having a mirror attachment reference face; and a mirror fixture including arm-like press parts for pressing and fixing the half mirror against and to the mirror attachment reference face of the optical system unit, and an attachment part fixed to the optical system unit and having a pair of opposed engagement piece parts, wherein the attachment part of the mirror fixture is housed in a recess part of the optical system unit, the pair of opposed engagement piece parts of the attachment part are retained on a pair of opposed walls in the recess part in a press state, the engagement piece parts comprise operational piece parts for elastically deforming the engagement pieces parts inward for releasing a retention state of the engagement piece parts from the walls of the recess part, and each of the press parts is in contact with the half mirror, and wherein the operational piece parts are projected backward from the engagement piece parts and the optical system unit is provided with an operational jig insertion recess-in part for housing the operational piece parts and being wider than the recess part.

4. The light scanner as claimed in claim 3 wherein the operational piece part has a plate piece part provided in one piece extending between lower end margins of the engagement piece parts and the plate piece part is formed with a split groove extending forward from the rear end of the plate piece part.

5. The light scanner as claimed in claim 3 wherein the plate piece part is put on a bottom wall of the recess part and is formed with an insertion hole of a mounting screw screwed into the optical system unit.

6. The light scanner according to claim 2, wherein the half mirror is fixed inside the optical system unit inclined state.

7. The light scanner according to claim 2, wherein the attachment part is located above a lower end of each of the press parts.

* * * * *